US008901234B2

(12) United States Patent
Asai et al.

(10) Patent No.: US 8,901,234 B2
(45) Date of Patent: *Dec. 2, 2014

(54) ADHESIVE COMPOSITION

(75) Inventors: Takahiro Asai, Kawasaki (JP); Koichi Misumi, Kawasaki (JP); Hirofumi Imai, Kawasaki (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/457,579

(22) Filed: Jun. 16, 2009

(65) Prior Publication Data

US 2009/0311526 A1 Dec. 17, 2009

(30) Foreign Application Priority Data

Jun. 17, 2008 (JP) ................................. 2008-158391
Mar. 25, 2009 (JP) ................................. 2009-074898

(51) Int. Cl.
*C08F 222/40* (2006.01)
*C08L 37/00* (2006.01)
*C08L 39/00* (2006.01)
*C09J 133/14* (2006.01)
*C09J 135/06* (2006.01)

(52) U.S. Cl.
CPC .............. *C09J 133/14* (2013.01); *C09J 135/06* (2013.01)
USPC ................ 524/548; 428/355 R; 428/355 CN; 524/555; 524/556; 524/560; 524/562; 526/263

(58) Field of Classification Search
CPC ...... C09J 133/06; C09J 133/08; C09J 133/10; C09J 133/14; C09J 135/06
USPC .......... 524/548, 555, 556, 560, 562; 526/263; 428/355 R, 355 CN
See application file for complete search history.

(56) References Cited

U.S. PATENT DOCUMENTS

| 4,468,453 | A | | 8/1984 | Nakamura et al. | |
| 5,820,930 | A | | 10/1998 | Bruneau et al. | |
| 5,872,184 | A | * | 2/1999 | Mori et al. | 525/71 |
| 5,889,113 | A | * | 3/1999 | Mori et al. | 525/71 |
| 6,214,931 | B1 | * | 4/2001 | Segers et al. | 525/34 |
| 6,225,401 | B1 | * | 5/2001 | Rehmer et al. | 524/800 |
| 6,337,288 | B1 | | 1/2002 | Ohya et al. | |
| 6,509,125 | B1 | | 1/2003 | Ito et al. | |
| 7,097,950 | B2 | | 8/2006 | Tanaka et al. | |
| 7,097,959 | B1 | | 8/2006 | Ryu et al. | |
| 7,268,061 | B2 | | 9/2007 | Miyanari et al. | |
| 7,385,007 | B2 | * | 6/2008 | Moroishi et al. | 525/192 |
| 7,473,753 | B2 | | 1/2009 | Parhar et al. | |
| 2002/0028302 | A1 | | 3/2002 | Okazaki et al. | |
| 2002/0127821 | A1 | | 9/2002 | Ohya et al. | |
| 2002/0187429 | A1 | | 12/2002 | Kozaki et al. | |
| 2003/0027942 | A1 | | 2/2003 | Oota et al. | |
| 2003/0036017 | A1 | | 2/2003 | Tanizaki et al. | |
| 2005/0014879 | A1 | * | 1/2005 | Moroishi et al. | 524/261 |
| 2005/0075444 | A1 | * | 4/2005 | Tosaki et al. | 524/502 |
| 2005/0170612 | A1 | | 8/2005 | Miyanari et al. | |
| 2006/0057371 | A1 | | 3/2006 | Kobayashi et al. | |
| 2006/0124241 | A1 | | 6/2006 | Doi et al. | |
| 2008/0019078 | A1 | | 1/2008 | Arimitsu et al. | |
| 2008/0102241 | A1 | * | 5/2008 | Yutou et al. | 428/41.8 |
| 2009/0035567 | A1 | | 2/2009 | Maruyama | |
| 2009/0137760 | A1 | | 5/2009 | Misumi et al. | |

FOREIGN PATENT DOCUMENTS

| JP | 61-158145 | 7/1986 |
| JP | 61-174209 | 8/1986 |
| JP | 63-234009 | 9/1988 |
| JP | 4-146984 | 5/1992 |
| JP | 6-41506 | 2/1994 |
| JP | 7-34052 | 2/1995 |
| JP | 7-41748 | 2/1995 |
| JP | 7-86756 | 3/1995 |
| JP | 9-183950 | 7/1997 |
| JP | 2000-171635 | 6/2000 |
| JP | 2001-279208 | 10/2001 |
| JP | 2002-3559 | 1/2002 |
| JP | 2003-173993 | 6/2003 |
| JP | 2003-292931 | 10/2003 |
| JP | 2006-213790 | 8/2006 |
| JP | 2007-077388 | 3/2007 |
| JP | 2007-99791 | 4/2007 |
| JP | 2007-119646 | 5/2007 |
| JP | 2008-166841 | 7/2008 |
| WO | 2006/137304 | 12/2006 |

OTHER PUBLICATIONS

USPTO Office Action issued May 13, 2010 in U.S. Appl. No. 12/662,120, which is a divisional of the present application.
U.S. Office Action dated Mar. 16, 2011 in U.S. Appl. No. 12/950,203.
U.S. Office Action dated Mar. 18, 2011 in U.S. Appl. No. 12/960,819.
U.S.P.T.O. Office Action dated Apr. 14, 2014 in copending U.S. Appl. No. 12/924,583.
U.S. Patent Office Action dated Jun. 11, 2013 issued in corresponding U.S. Appl. No. 12/924,583.
Japanese Office Action mailed Jul. 2, 2013 in corresponding Japanese Patent Application No. JP 2009-074898.
U.S. Office Action issued Sep. 13, 2011 in corresponding U.S. Appl. No. 12/960,819.
US Office Action issued Nov. 18, 2011 in U.S. Appl. No. 12/960,819, which is a divisional of the present application.
U.S. Office Action issued Dec. 12, 2012 in copending related U.S. Appl. No. 12/924,583.

(Continued)

*Primary Examiner* — David W Wu
*Assistant Examiner* — Marie Reddick
(74) *Attorney, Agent, or Firm* — Wenderoth, Lind & Ponack, L.L.P.

(57) ABSTRACT

An adhesive composition of the present invention contains, as a main composition, a polymer obtained by copolymerizing a monomer composition containing a monomer having a maleimide group, and further contains a thermal polymerization inhibitor. As a result, it is possible to provide an adhesive composition that allows forming an adhesive layer that is excellently dissolved after the adhesive layer has been subjected to a high-temperature process.

10 Claims, No Drawings

(56) References Cited

OTHER PUBLICATIONS

Office Action issued Dec. 18, 2012 in corresponding Japanese Application No. 2008-106666.
Office Action issued Feb. 25, 2013 in copending related U.S. Appl. No. 12/924,583.
U.S. Office Action issued Oct. 21, 2010 in corresponding U.S. Appl. No. 12/662,120.
U.S. Office Action issued Apr. 1, 2011 in corresponding U.S. Appl. No. 12/924,583.
U.S. Final Office Action issued Sep. 21, 2011 in corresponding U.S. Appl. No. 12/924,583.
U.S. Office Action issued Jul. 18, 2012 in corresponding U.S. Appl0 No. 12/924,583.
Taiwanese Office Action issued Jun. 25, 2012 in corresponding Taiwanese Application No. 98102304 corresponding to U.S. Appl. No. 12/924,583.
U.S.P.T.O. Office Action dated Jun. 4, 2014 in copending U.S. Appl. No. 12/960,819.

* cited by examiner

ADHESIVE COMPOSITION

This Nonprovisional application claims priority under 35 U.S.C. §119(a) on Patent Applications No. 2008-158391 filed in Japan on Jun. 17, 2008 and No. 2009-074898 filed in Japan on Mar. 25, 2009, the entire contents of which are hereby incorporated by reference.

TECHNICAL FIELD

The present invention relates to an adhesive composition, a film adhesive, and a heat treatment method. More specifically, the present invention relates to (i) an adhesive composition and a film adhesive, each for temporarily fixing a sheet or a protection board to a semiconductor product, in a step of carrying out processing such as grinding of semiconductor products (e.g., semiconductor wafer), optical products, and the like, and (ii) a heat treatment method using the adhesive composition.

Background Art

In recent years, due to multiple functioning of mobile phones, digital AV devices, IC cards, and the like, demands have been increasing for downsizing, reduction in thickness, and high integration of semiconductor silicon chips (hereinafter referred to as "chips"). For example, the reduction of thickness is demanded for integrated circuits in which a plurality of chips are integrated, as typified by CSP (chip size package) and MCP (multi-chip package). Among these integrated circuits, a system-in-package (SiP) in which a plurality of semiconductor chips are mounted in a single semiconductor package has become an extremely important technique in order to accomplish downsizing, reduction in thickness, and high integration of chips that are installed in the semiconductor package. The downsizing, reduction in thickness and high integration enables realization of multiple functioning, downsizing, and reduction of weight of electronic devices.

In order to respond to the needs for a thin product, it is required to reduce the thickness of a chip to not more than 150 mm. Further, it is required to process a chip so that its thickness is reduced to not more than 100 mm for the CSP and the MCP, and not more than 50 mm for the IC card.

Conventionally, SiP products are manufactured by use of a method in which respective bumps (electrodes) provided on each of stacked chips are wired to a circuit board by a wire bonding technique. In order to respond to the demand for the reduction in thickness and high integration, a through-hole electrode technique is required, not the wire bonding technique. The through-hole electrode technique is a technique in which (i) chips each having a through-hole electrode are stacked and (ii) a bump is formed on a backside of the chips thus stacked.

A thin chip is manufactured by, for example, in a method as follows: (i) a high purity single crystal silicon or the like is sliced to a wafer form, (ii) a predetermined circuit pattern of an IC or the like is formed on a surface of the wafer by etching the surface of the wafer so that an integrated circuit is built, (iii) a back surface of the semiconductor wafer thus obtained is grinded by use of a grinder, and (iv) after the semiconductor wafer is grinded to a predetermined thickness, the semiconductor wafer is diced so as to form a chip shape. At this time, the predetermined thickness is around a range of 100 μm to 600 μm. Further, in a case where a through-hole electrode is to be formed, the wafer is grinded to a thickness of around a range of 50 μm to 100 μm.

In the manufacture of the semiconductor chip, the semiconductor wafer readily breaks if external force is given to the wafer in the grinding step or at the time when the wafer is carried to the dicing step. This is because the semiconductor wafer is thin and fragile, and because circuit patterns are unlevel. Moreover, in the grinding step, purified water is used to clean the back surface of the semiconductor wafer for removing grinding dust and heat generated at the time of grinding, while grinding process is carried out. At this time, there is the need to prevent contamination of a circuit pattern surface due to the purified water used in cleaning.

Accordingly, in order to protect the circuit pattern surface of the semiconductor wafer and prevent breakage of the semiconductor wafer, a film adhesive for processing is attached on the circuit pattern surface while the grinding process is carried out.

Moreover, at the time of the dicing, the semiconductor wafer is diced in a state in which a protection sheet is attached to a back surface of the semiconductor wafer so that the semiconductor wafer is fixed. Chips obtained by the dicing are pushed up by use of a needle from a film base material side, and are fixed on a die pad.

Known types of film adhesives for processing and protection sheets as such include, for example, ones in which an adhesive layer made of an adhesive composition is provided on a base material film such as polyethylene terephthalate (PET), polyethylene (PE), polypropylene (PP), or ethylene-vinyl acetate copolymer (EVA) (for example: Japanese Patent Application Publication, Tokukai, No. 2003-173993 A (Publication Date: Jun. 20, 2003; Japanese Patent Application Publication, Tokukai, No. 2001-279208 A (Publication Date: Oct. 10, 2001); Japanese Patent Application Publication, Tokukai, No. 2003-292931 A (Publication Date: Oct. 15, 2003)).

An arrangement has also been disclosed (Japanese Patent Application Publication, Tokukai, No. 2002-203821 A (Publication Date: Jul. 19, 2002)) in which a protection board is used instead of using the film adhesive for processing or the protection sheet. The protection board is an aluminum nitride-boron nitride pore sintered body impregnated with ladder-type silicone oligomer. In the arrangement, this protection board and the semiconductor wafer are adhered together by use of a thermoplastic film. There is also a method in which a material such as alumina, aluminum nitride, boron nitride, or silicon carbide, each of which has substantially the same thermal expansivity as the semiconductor wafer, is used as the protection board, and thermoplastic resin such as polyimide is used as an adhesive for attaching the protection board to the semiconductor wafer (Japanese Patent Application Publication, Tokukai, No. 2001-77304 A (Publication Date: Mar. 23, 2001)). This method suggests applying the adhesive in a form of a film having a thickness in a range of 10 μm to 100 μm. As a method for forming the film, this method suggests that an adhesive composition is applied by spin coating and then dried so that an obtained film has a thickness of not more than 20 μm.

Moreover, due to multilayer interconnection of semiconductor elements, a process is conducted such that: (i) a protection board is adhered, by use of the adhesive composition, to a surface of the semiconductor wafer on which a circuit is formed; (ii) a back surface of the semiconductor wafer is polished; (iii) the back surface thus polished is etched to form a mirror plane; and (iv) a back surface circuit is formed on the mirror plane. In this case, the protection board is adhered to the semiconductor wafer until the back surface circuit is formed (Japanese Patent Application Publication, Tokukai-sho, No. 61-158145 A (Publication Date: Jul. 17, 1986)).

SUMMARY OF INVENTION

Technical Problem

However, the following problems occur in a case where the conventional film adhesive for processing and the like are used in steps which require high-temperature processing and high vacuum processing, as like in formation of the through-hole electrode: a problem of poor adhesion caused by insufficient adhesive strength in a high temperature environment or generation of gas in a high vacuum environment; or a problem of poor stripping such as residue remaining at the time of stripping following the high-temperature processing.

For example, in the formation of the through-hole electrode, when semiconductor chips are to be connected to each other after formation of a bump on each of the semiconductor chips, a process is required in which heat is applied to the semiconductor chips to approximately 200° C., and further the semiconductor chips is processed in a high vacuum state. However, the adhesive composition which constructs an adhesive layer of a protection tape, according to Japanese Patent Application Publication, Tokukai, No. 2003-173993 A (Publication Date: Jun. 20, 2003; Japanese Patent Application Publication, Tokukai, No. 2001-279208 A (Publication Date: Oct. 10, 2001), has no resistance against such a high temperature of 200° C. Moreover, gas is generated due to application of heat. This gas causes the poor adhesion.

The thin semiconductor wafer requires to be stripped off from the protection board after the grinding and dicing. However, the adhesive composition, which constructs an adhesive layer of a protection tape, disclosed in Japanese Patent Application Publication, Tokukai, No. 2003-292931 A (Publication Date: Oct. 15, 2003), is an epoxy resin composition. At a high temperature of 200° C., the epoxy resin changes in quality and cures. This causes residue to remain at the time of stripping, thereby causing poor stripping.

Further, in the thermoplastic film, according to Japanese Patent Application Publication, Tokukai, No. 2002-203821 A (Publication Date: Jul. 19, 2002) and Japanese Patent Application Publication, Tokukai, No. 2001-77304 A (Publication Date: Mar. 23, 2001), used for adhering a protection board to a semiconductor wafer, gas derived from absorbed moisture is generated. This causes the problem of poor adhesion. The processing method of the semiconductor substrate, according to Japanese Patent Application Publication, Tokukaisho, No. 61-158145 A (Publication Date: Jul. 17, 1986), carries out a mirror surfacing process by use of an etching liquid and formation of a metal film by vacuum deposition. In order to carry out these processes, the adhesive composition for adhering a protection board to a semiconductor wafer requires heat resistance and stripping property. However, Japanese Patent Application Publication, Tokukaisho, No. 61-158145 A (Publication Date: Jul. 17, 1986) includes no disclosure regarding formation of the adhesive composition.

Studies conducted by inventors of the present invention resulted in that, in processing of a semiconductor wafer and a chip, an adhesive, which uses an acrylic resin material, is preferably used, due to its crack resistance. However, the inventors found that the following problems occur even when the adhesive, which uses such an acrylic resin material, is used.

(1) Adhesive strength is weak in a high temperature environment, due to an occurrence of a bubble-form strip on an adhesive surface at the time when the adhesive layer and the protection board are thermally compressed together, caused by generation of gas from moisture absorbed by the adhesive layer. Such generation of gas causes problems, not only that the adhesive strength is weakened in the high temperature environment, but also difficulty in production and maintenance of a vacuum environment in a case where processing is carried out under vacuum conditions.

(2) In a case where there is a step at which a semiconductor wafer has contact with an alkaline liquid such as an alkaline slurry or an alkaline developer, a contact surface of the adhesive composition deteriorates due to stripping, melting, diffusion or the like caused by the alkaline liquid.

(3) In a case where the adhesive is heated to approximately 200° C., the adhesive composition changes in quality due to low heat resistance. This causes poor stripping such as formation of an insoluble substance in a stripping solution.

The present invention is accomplished in view of the above problems. An object of the present invention is to provide an adhesive composition (i) which has high adhesive strength in a high temperature environment (especially at a temperature of 200° C. to 250° C.), high heat resistance, and alkaline resistance, (ii) which has low moisture absorbency, and (iii) which can be easily stripped off from a semiconductor wafer, a chip, and the like even after the adhesive composition has been processed in a high temperature environment and/or in a high vacuum environment (hereinafter, simply referred to as a "high-temperature process").

In order to achieve the above object, an adhesive composition of the present invention is an adhesive composition whose main component is a polymer obtained by copolymerizing a monomer composition containing a monomer having a maleimide group and which further contains a thermal polymerization inhibitor.

Additional objects, features, and strengths of the present invention will be made clear by the description below. Further, the advantages of the present invention will be evident from the following explanation in reference to the drawings.

DESCRIPTION OF EMBODIMENTS

[Adhesive Composition]

One embodiment of an adhesive composition of the present invention is described below.

The adhesive composition of the present invention is an adhesive composition whose main component is a polymer obtained by copolymerizing a monomer composition containing a monomer (hereinafter referred to as a maleimide group-containing monomer) having a maleimide group and which further contains a thermal polymerization inhibitor.

A concrete purpose of the adhesive composition of the present invention is not especially limited provided that the adhesive composition is used as an adhesive. The present embodiment deals with, as an example, a case where the adhesive composition of the present invention is used for temporarily adhering a semiconductor wafer to a support plate in a wafer support system.

In the present specification, "main component" means that a content of the component is larger than those of any other components contained in the adhesive composition of the present invention. Accordingly, the content of the main component is not limited as long as the content is largest among those of components contained in the adhesive composition. However, the content of the main component is preferably not less than 50 parts by weight but not more than 100 parts by weight, more preferably not less than 70 parts by weight but not more than 100 parts by weight, where a total amount of the adhesive composition is 100 parts by weight. In a case where the content of the main component is not less than 50 parts by weight, the adhesive composition of the present invention successfully exhibits effects of high heat resistance, high adhesive strength in a high temperature environment (especially, 200° C. to 250° C.), alkaline resistance, and easiness in stripping after a high-temperature process such as a heat treatment in which the adhesive composition is heated at 250° C. for 1 hour. In the present specification and the like, "support plate" indicates a substrate used for protecting a semiconductor wafer in such a manner that the support plate is attached to the semiconductor wafer while the semiconductor wafer is being grinded, so that occurrences of cracks and distortion of the semiconductor wafer are prevented.

(Thermal Polymerization Inhibitor)

The adhesive composition of the present invention contains a thermal polymerization inhibitor. The thermal polymerization inhibitor is a material effective to prevent a radical polymerization reaction due to heat. Since reaction of the thermal polymerization inhibitor with a radical more preferentially proceeds than reaction of a radical with a monomer, polymerization is inhibited. On this account, in the adhesive composition of the present invention, a polymerization reaction of the adhesive composition in a high temperature environment (especially, 250° C. to 350° C.) is restrained. As a result, even after the adhesive composition has been subjected to a high-temperature process in which the adhesive composition is heated at 250° C. for 1 hour, the adhesive composition can be easily dissolved. Consequently, it is possible to easily strip off an adhesive layer made from the adhesive composition even after the adhesive layer has been subjected to the high-temperature process and to restrain that a residue of the adhesive layer remains.

The thermal polymerization inhibitor is not especially limited provided that the thermal polymerization inhibitor effectively prevents a radical polymerization reaction due to heat. However, the thermal polymerization inhibitor is preferably a phenolic thermal polymerization inhibitor.

Examples of the thermal polymerization inhibitor encompass: pyrogallol; benzoquinone; hydroquinone, methylene blue; tert-butylcatechol; monobenzyl ether; methylhydroquinone; amylquinone; amyloxy hydroquinone; n-butylphenol; phenol; hydroquinone monopropyl ether; 4,4'-(1-methylethylidene) bis(2-methylphenol); 4,4'-(1-methylethylidene) bis(2,6-dimethylphenol); 4,4'-[1-[4-(1-(4-hydroxyphenyl)-1-methylethyl)phenyl]ethylidene] bisphenol; 4,4',4"-ethylidenetris(2-methylphenol), 4,4',4"-ethylidenetrisphenol; 1,1,3-tris(2,5-dimethyl-4-hydroxyphenyl)-3-phenylpropan, 2,6-di-tert-butyl-4-methylphenol; 2,2'-methylene bis(4-methyl-6-tert butylphenol); 4,4'-butylidene bis(3-methyl-6-tert butylphenol); 4,4'-tiobis(3-methyl-6-tert butylphenol); 3,9-bis[2-(3-(3-tert butyl-4-hydroxy-5-methylphenyl)-propionyloxy)-1,1-dimet hylethyl]-2,4,8, 10-tetraoxaspiro(5,5)undecane; triethyleneglycol-bis-3-(3-tert butyl-4-hydroxy-5-methylphenyl)propionate; n-octyl -3-(3,5-di-tert butyl-4-hydroxyphenyl)propionate; pentaerythritol tetrakis[3-(3,5-di-tert butyl-4-hydroxyphenyl)propionate] (product name: IRGANOX1010, manufactured by Ciba Speciality Chemicals Corporation); tris(3,5-di-tert butylhydroxybenzyl) isocyanurate; and tiodiethylene bis[3-(3,5-di tert butyl-4-hydroxyphenyl) propionate]. Among them, phenolic thermal polymerization inhibitors are preferable.

A content of the thermal polymerization inhibitor may be determined as appropriate in accordance with a polymer contained as a main component, a purpose of the adhesive composition, and a usage environment. However, the thermal polymerization inhibitor is preferably contained by not less than 0.1 wt % but not more than 10.0 wt %, more preferably not less than 0.5 wt % but not more than 7.0 wt %, and most preferably not less than 1.0 wt % but not more than 5.0 wt %. By containing the thermal polymerization inhibitor within the above range, the adhesive composition can successfully exhibit an effect to restrain polymerization due to heat so that the adhesive layer that has been subjected to the high-temperature process can be more easily stripped off. Further, the containing of the inhibitor within the above range can prevent an occurrence of cracks.

(Maleimide Group-Containing Monomer)

The adhesive composition according to the present invention contains, in the monomer composition, a maleimide group-containing monomer. The adhesive composition obtained by containing the maleimide group-containing monomer has an imide ring (a heterocyclic ring having an imide group) in a main chain of a polymer that is a main component of the adhesive composition. This improves the heat resistance and the adhesive strength in a high temperature environment (especially, 200° C. to 250° C.), of the adhesive composition. Further, an adhesive layer made from the adhesive composition can be easily stripped off even after the adhesive layer has been subjected to a high-temperature process such as a heat treatment in which the adhesive layer is heated at 250° C. for 1 hour.

The maleimide group-containing monomer is not especially limited provided that the monomer has a maleimide group and can be copolymerized with other monomer components. However, the maleimide group-containing monomer is preferably a compound represented by General Formula (1):

Chem. 1

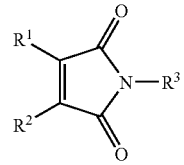

(1)

(where $R^1$ through $R^3$ independently represent a hydrogen atom or a C1 through C20 organic group, and the organic group may contain an oxygen atom, a nitrogen atom, a sulfur atom, and a halogen atom.)

The organic group represented by $R^1$ or $R^2$ in General Formula (1) is preferably a hydrogen atom, a methyl group, or an ethyl group. Among them, a hydrogen atom is more preferable.

The organic group represented by $R^3$ in General Formula (1) is preferably a straight or branched alkyl group, an alicyclic hydrocarbon group, an aryl group, an aralkyl group, or an organic group having a maleimide group. Among them, the alkyl group, the alicyclic hydrocarbon group, and the aryl group are more preferable.

Here, an "aliphatic series" is a relative concept with respect to an aromatic series and defined as a group, a compound, or the like having no aromatic property. For example, the "alicyclic hydrocarbon group" indicates a monocyclic hydrocarbon group or a polycyclic hydrocarbon group having no aromatic property.

The alkyl group, the alicyclic hydrocarbon group, or the aryl group, represented by $R^3$, may have a substituent group. The substituent group is not especially limited, and may be, for example, a halogen atom, a straight or branched C1 to C6 alkyl group, a C3 to C6 alicyclic hydrocarbon group, or the like. Here, "having a substituent group" means that part of or all hydrogen atoms in the alkyl group, the alicyclic hydrocarbon group, or the aryl group is/are substituted with a substituent group. The halogen atom may be, for example, a fluorine atom, a chlorine atom, a bromine atom, an iodine atom, or the like. The fluorine atom is especially preferable as the halogen atom.

Examples of the alkyl group represented by $R^3$ encompass a methyl group, an ethyl group, a propyl group, a butyl group, a pentyl group, a hexyl group, a heptyl group, an octyl group, a lauryl group, and a stearyl group. Among them, the methyl group is preferable.

Examples of a maleimide group-containing monomer in which the organic group represented by $R^3$ is the alkyl group encompass: N-methylmaleimide; N-ethylmaleimide; N-n-propylmaleimide; N-isopropylmaleimide; N-n-butylmaleimide; N-isobutylmaleimide; N-sec-butylmaleimide; N-tert-butylmaleimide; N-n-pentylmaleimide; N-n-hexylmaleimide; N-n-heptylmaleirhide; N-n-octylmaleimide; N-laurylmaleimide; and N-stearylmaleimide. Among them, the N-methylmaleimide is preferable in terms of stability in industrial supply and heat resistance.

The alicyclic hydrocarbon group represented by $R^3$ may be a cyclopropyl group, a cyclobutyl group, a cyclopentyl group, a cyclohexyl group, a cycloheptyl group, or a cyclooctyl group. Among them, the cyclohexyl group is preferable.

Examples of a maleimide group-containing monomer in which the organic group represented by $R^3$ is the alicyclic hydrocarbon group encompass: N-cyclopropylmaleimide; N-cyclobutylmaleimide; N-cyclopentylmaleimide; N-cyclohexylmaleimide; N-cycloheptylmaleimide; and N-cyclooctylmaleimide. Among them, the N-cyclohexylmaleimide is preferable in terms of stability in industrial supply and heat resistance.

The aryl group represented by $R^3$ may be a phenyl group, a methylphenyl group, or the like. Among them, the phenyl group is preferable.

Examples of a maleimide group-containing monomer in which the organic group represented by $R^3$ is the aryl group encompass: N-phenylmaleimide; N-m-methylphenylmaleimide; N-o-methylphenylmaleimide; and N-p-methylphenylmaleimide. Among them, the N-phenylmaleimide is preferable in terms of stability in industrial supply and heat resistance.

In addition to the above examples, there are further other examples of the maleimide group-containing monomer such as: N-benzylmaleimide; N-phenethylmaleimide; 1-methyl-2,4-bismaleimidebenzene; N,N'-m-phenylene bismaleimide; N,N'-p-phenylene bismaleimide; N,N'-m-toluylene bismaleimide; N,N'-4,4-biphenylene bismaleimide; N,N'-4,4-(3,3'-dimethyl-biphenylene)bismaleimide; N,N'-4,4-(3,3'-dimethyl diphenyl methane)bismaleimide; N,N'-4,4-(3-3'-diethyl diphenyl methane)bismaleimide; N,N'-4,4-diphenylmethane bismaleimide; N,N'-4,4-diphenylpropane bismaleimide; N,N'-3-3'-diphenylsulfone bismaleimide; N,N'-4,4-diphenyl ether bismaleimide; and the like.

These maleimide group-containing monomers constituting a polymer that is a main component of the adhesive composition may be used solely or in combination.

A mixed amount of the maleimide group-containing monomer is not limited provided that copolymerization reaction with other compounds contained in the monomer composition proceeds, and may be set as appropriate in accordance with aimed properties of the adhesive composition, such as aimed adhesive strength and heat resistance. However, the maleimide group-containing monomer is preferably contained in the monomer composition by not less than 1.0 wt % but not more than 25 wt %, more preferably not less than 5 wt % but not more than 20 wt %. In a case where the maleimide group-containing monomer is contained by not less than 1.0 wt %, it is possible to obtain an adhesive in which the heat resistance and the adhesive strength in a high temperature environment are more improved. Further, in a case where the maleimide group-containing monomer is contained by not more than 25 wt %, it is possible to obtain an adhesive that can be more easily stripped off even after the adhesive has been subjected to a high-temperature process.

(Styrene)

The adhesive composition according to the present embodiment may further contain styrene in the monomer composition. Properties of the styrene do not change even in a high temperature environment of not less than 200° C. This allows improvement in the heat resistance of the adhesive composition.

In a case where the monomer composition contains styrene, a mixed amount of the styrene is not limited provided that copolymerization reaction of the styrene with other compounds contained in the monomer composition proceeds, and may be set as appropriate in accordance with aimed properties of the adhesive composition, such as aimed adhesive strength and heat resistance. However, the styrene is preferably mixed in the monomer composition by not less than 1 part by weight but not more than 60 parts by weight, more preferably not less than 20 parts by weight but not more than 60 parts by weight, where a total amount of the monomer composition containing the styrene and the maleimide group-containing monomer is 100 parts by weight. In a case where the styrene is mixed by not less than 1 part by weight, it is possible to obtain an adhesive in which the heat resistance is more improved. Further, in a case where the styrene is mixed by not more than 60 parts by weight, it is possible to obtain an adhesive in which crack resistance is improved.

(Styrene Block Segment)

The polymer that is the main component of the adhesive composition according to the present embodiment may have a styrene block segment.

An adhesive composition whose main component is a polymer having a styrene block segment prevents generation of gas on an interface between the adhesive composition and an adhered object. Therefore, it is possible to obtain an adhesive composition which prevents interlayer stripping of the adhesive composition caused by generation of gas on the interface at the time of heating and vacuuming, and which has an improved adhesive strength in a high temperature environment.

Moreover, dissociation of molecular chains of the adhesive composition is suppressed in the high temperature environment. This makes it possible to prevent quality changes of the adhesive composition in the high temperature environment. Hence, the adhesive strength of the adhesive composition improves, and furthermore, an adhesive layer made from the adhesive composition can be easily stripped even after the adhesive layer has been processed at a high temperature.

Further, the formation of the styrene in a block form causes a pseudo sea-island structure in a coating film made from the adhesive composition, thereby forming a relatively hard region and a relatively soft region. This can cause stress relief due to heat. As a result, it is possible to restrain an occurrence of cracks while high-temperature resistance of the adhesive composition is maintained. Moreover, the restraining of the occurrence of cracks can further restrain intrusions of solvent and dust from the cracks. This reduces defects in processes and improves a production yield in the processes.

The "styrene block segment" in the present specification is a part in which the styrene is copolymerized by units of blocks in the polymer. Addition of the styrene after polymerization has been initiated causes the styrene to be formed in a block unit just including the styrene. This is because, at this point, copolymerization of other components has been mostly completed. As such, the styrene block segment is a block copolymer obtained by polymerization of just the styrene that is added after the initiation of polymerization of other monomer components.

The formation of the styrene block segment from the styrene is carried out as follows. That is, all or part of styrene used in production of the adhesive composition is added, at once or stepwise, to a copolymerization reaction system, that is, a reaction container or the like in which copolymerization of a remaining part of the styrene and other monomer components including the maleimide group-containing monomer is being carried out.

An amount of styrene for forming a styrene block segment is adjusted by an amount of styrene to be added after the copolymerization reaction has been initiated. The amount may be set as appropriate in accordance with aimed properties of the adhesive composition, such as aimed adhesive strength, heat resistance, and the like, but is preferably not less than 1 part by weight but not more than 100 parts by weight where a total amount of styrene used in the production of the adhesive composition of the present embodiment is 100 parts by weight.

The styrene to be added after the initiation of the copolymerization reaction is preferably added at once. That is, it is preferable that all the styrene be added at once. Further, it is preferable that the styrene be added before half the time required for the copolymerization reaction has elapsed. This causes the styrene to be copolymerized in close contact with each other, thereby favorably forming the styrene block segment in the adhesive composition.

(Alkyl(Meth)Acrylate)

The adhesive composition of the present invention may further contain an alkyl(meth)acrylate in the monomer composition.

In the present specification, the alkyl(meth)acrylate denotes acrylic long-chain alkyl ester having a C15 to C20 alkyl group, and acrylic alkyl ester having a C1 to C14 alkyl group.

By containing the alkyl(meth)acrylate in the monomer composition, a content ratio of alkyl chains included in the polymer mainly contained in the adhesive composition increases. This can cause stress relief in the adhesive composition, thereby resulting in that an occurrence of cracks can be restrained while high-temperature resistance is maintained. Further, the restraining of the occurrence of cracks can restrain intrusion of solvent and dust from the cracks. Consequently, this reduces defects in processes and improves a production yield in the processes.

Examples of the acrylic long-chain alkyl ester encompass alkyl esters of an acrylic or methacrylic acid whose alkyl group is an n-pentadecyl group, an n-hexadecyl group, an n-heptadecyl group, an n-octadecyl group, an n-nonadecyl group, n-eicosyl group, or the like. Note that the alkyl group of the acrylic long-chain alkyl ester may be straight or branched.

The acrylic alkyl ester having the C1 to C14 alkyl group may be publicly known acrylic alkyl esters that are used in conventional (meth)acrylic adhesives. Examples of these acrylic alkyl esters are, for example, alkyl esters of an acrylic or methacrylic acid whose alkyl group is a methyl group, an ethyl group, a propyl group, a butyl group, a 2-ethylhexyl group, an isooctyl group, an isononyl group, an isodecyl group, a dodecyl group, a tridecyl group, a lauryl group, or the like.

These alkyl(meth)acrylates for constituting the polymer that is a main component of the adhesive composition may be used solely or in combination.

A mixed amount of the alkyl(meth)acrylate is not limited provided that copolymerization with other compounds contained in the monomer composition proceeds, and may be set as appropriate in accordance with aimed properties of the adhesive composition, such as intended adhesive strength and heat resistance. However, the mixed amount of the alkyl(meth)acrylate is preferably not less than 10 parts by weight but not more than 90 parts by weight, more preferably not less than 20 parts by weight but not more than 80 parts by weight, where a total amount of the monomer composition containing the alkyl(meth)acrylate and the maleimide group-containing monomer is 100 parts by weight. The mixed amount of the alkyl(meth)acrylate of not less than 10 parts by weight allows an improvement in flexibility and crack resistance of an obtained adhesive. In a case where the mixed amount of the alkyl(meth)acrylate is not more than 90 parts by weight, it is possible to obtain an adhesive in which a decrease in heat resistance, poor stripping, and moisture absorption are suppressed.

The adhesive composition of the present invention may contain, in the monomer composition, both the styrene and the alkyl(meth)acrylate. In a case where the monomer composition contains both the styrene and the alkyl(meth)acrylate, a mass ratio of the styrene and the alkyl(meth)acrylate in the monomer composition is not limited provided that essential properties of the present invention are not lost. However, the mass ratio of the alkyl(meth)acrylate with respect to the styrene is preferably in a range from 0.1 to 3, more preferably in a range from 0.5 to 2.5. The range allows the adhesive composition to have good heat resistance, adhesiveness, and the like properties.

(Bifunctional Monomer)

The adhesive composition of the present invention further contains a bifunctional monomer. By containing the bifunctional monomer, constituent molecules of an obtained adhesive composition are cross-linked via the bifunctional monomer. A three-dimensional structure is generated due to the crosslinking, which causes an increase in mass-average molecular weight of the adhesive composition. It is generally known in the technical field of adhesives that the increase in the mass-average molecular weight of the constituent molecules improves internal energy of the adhesive composition. It is also known that the internal energy is one cause of an obtained strength of the adhesive strength in the high temperature environment. Moreover, the increase in the mass-average molecular weight of the adhesive composition causes a rise in an apparent glass transition point. As a result of this, the adhesive strength improves. That is to say, by further containing the bifunctional monomer in the monomer composition, the mass-average molecular weight of the adhesive composition increases, which causes the adhesive strength to increase in the high temperature environment.

Further, by containing the bifunctional monomer in the monomer composition, it is possible to suppress an occurrence of dissociation between molecular chains in a high temperature environment, which dissociation occurs within the adhesive composition. This causes an improvement in the adhesive strength at a high temperature, and even after the high-temperature process is carried out to the adhesive composition, the adhesive composition can be easily stripped off. Further, it is possible to restrain a content of a carboxyl group in the aforementioned polymer to be low, which carboxyl group causes a decrease in alkaline resistance. As a result, the adhesive composition containing the polymer as a main component has high alkaline resistance.

Consequently, it is possible to provide an adhesive composition which has more improved heat resistance, alkaline resistance, and adhesive strength in a high temperature environment, and which allows an adhesive layer made from the adhesive composition to be more easily stripped off after the adhesive layer has been subjected to a high-temperature process.

The bifunctional monomer in the present specification denotes a compound, which has two functional groups. Namely, the bifunctional monomer is not limited as long as the bifunctional monomer is a compound, which has two functional groups. However, it is preferable for the bifunctional monomer to be at least one of a bifunctional monomer selected from the group consisting of compounds represented by General Formula (2) as follows:
Chem. 2

$$X^1—R^4—X^2 \qquad (2)$$

(where $R^4$ is an organic group selected from a divalent C2 to C20 alkyl group and a divalent C6 to C20 organic group having a cyclic structure, and may have an oxygen atom; $X^1$ and $X^2$ are independently a (meth)acryloyl group or a vinyl group). Examples of the compounds represented by General Formula (2) encompass: dimethylol-tricyclodecane diacrylate, neopentyl glycol diacrylate, 1,9-nonanediol acrylate, naphthalene diacrylate, dicyclopentanyl diacrylate, and compounds represented by Formula (3) as follows:

Chem. 3

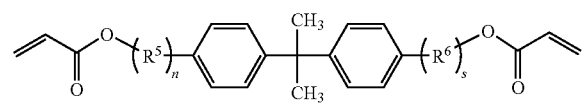

(3)

(where $R^5$ and $R^6$ independently represent ethylene oxide or propylene oxide; and n and s independently represent an integer of 0 to 4). These compounds may be used solely, or two or more of the compounds may be used in combination.

Among these bifunctional monomers, it is further preferable for the bifunctional monomer to be at least one bifunctional monomer selected from the group consisting of dimethylol-tricyclodecane diacrylate, neopentyl glycol diacrylate, 1,9-nonanediol acrylate, naphthalene diacrylate, dicyclopentanyl diacrylate, and the compounds represented by the Formula (3). These bifunctional monomers can be readily cross-linked with other monomer composition components, and crosslinking structures of such cross-linked bifunctional monomers are stable. Therefore, it is possible to obtain an adhesive composition which has further improved adhesive strength in a high temperature environment and further improved heat resistance.

In a case where the adhesive composition of the present invention contains the bifunctional monomer, an amount of the bifunctional monomer may be set as appropriate in accordance with aimed properties of the adhesive composition such as aimed adhesive strength. However, the amount of the bifunctional monomer is preferably in a range of 0.1 to 0.5 parts by weight, further preferably in a range of 0.1 to 0.3 parts by weight, where a total amount of the maleimide group-containing monomer, the styrene, and the alkyl(meth) acrylate is 100 parts by weight. The amount in the range of 0.1 to 0.5 parts by weight can further improve the adhesive strength in a high temperature environment and the heat resistance of an obtained adhesive composition. The amount in that range can also suppress moisture absorption, thereby making it possible to prevent gelling of the adhesive composition.

(Components other than Main Component in Adhesive Composition)

The adhesive composition according to the present embodiment may further include, to an extent in which essential properties of the present invention is not lost, miscible additives, for example, a commonly used addition resin, plasticizing agent, adhesive auxiliary agent, stabilization agent, coloring agent, and surface active agent, each of which improves effectiveness of the adhesive.

Further, the adhesive composition may be diluted by use of an organic solvent for adjusting viscosity of the adhesive composition, in the extent in which the essential properties of the present invention is not lost. Examples of the organic solvent encompass: ketones such as acetone, methyl ethyl ketone, cyclohexanone, methyl isoamyl ketone, and 2-heptanone; polyhydric alcohols and derivatives thereof such as monomethyl ethers, monoethyl ethers, monopropyl ethers, monobutyl ethers, or monophenyl ethers of ethylene glycol, ethylene glycol monoacetate, diethylene glycol, diethylene glycol monoacetate, propylene glycol, propylene glycol monoacetate, dipropylene glycol, or dipropylene glycol monoacetate; cyclic ethers such as dioxane; and esters such as methyl lactate, ethyl lactate, methyl acetate, ethyl acetate, butyl acetate, methyl pyruvate, ethyl pyruvate, methyl methoxy propionate, and ethyl ethoxy propionate. These organic solvents may be used solely, or two or more of the organic solvents may be used in combination. Particularly, it is more preferable to use the polyhydric alcohols and derivatives thereof such as the monomethyl ethers, monoethyl ethers, monopropyl ethers, monobutyl ethers, and monophenyl ethers of ethylene glycol, ethylene glycol monoacetate, diethylene glycol, diethylene glycol monoacetate, propylene glycol, propylene glycol monoacetate, dipropylene glycol, or dipropylene glycol monoacetate.

An amount of the organic solvent is set as appropriate in accordance with a film thickness of the adhesive composition to be applied, and is not particularly limited as long as the adhesive composition is in a concentration in which the adhesive composition can be applied to a supporting body such as a semiconductor wafer or the like. Generally, the adhesive composition is used so that a solid content concentration is in a range of 20 wt % to 70 wt %, and more preferably in a range of 25 wt % to 60 wt %.

[Preparing Method of Adhesive Composition]
(Copolymerization Reaction)

The copolymerization reaction of the monomer composition may be carried out by a publicly known method, and is not especially limited. For example, the polymer that is a main component of the adhesive composition of the present invention can be obtained by stirring the monomer composition by use of an existing stirring device.

A temperature condition in the copolymerization reaction may be set as appropriate and is not limited. However, the temperature condition is preferably in a range of 60 to 150° C., further preferably in a range of 70 to 120° C.

In the copolymerization reaction, a solvent may be used as appropriate. The aforementioned organic solvents can be used as the solvent. Among the aforementioned organic solvents, propylene glycol monomethyl ether acetate (hereinafter, referred to as "PGMEA") is more preferable.

In the copolymerization reaction according to the present embodiment, a polymerization initiator may be used as appropriate. Examples of the polymerization initiator encompass: azo compounds such as 2,2'-azobisisobutylonitrile, 2,2'-azobis(2-methylbutylonitrile), dimethyl 2,2'-azobis isobutyrate, 1,1'-azobis(cyclohexane-1-carbonitrile), and 4,4'-azobis(4-cyanovaleric acid); and organic peroxides such as decanoyl peroxide, lauroyl peroxide, benzoyl peroxide, bis (3,5,5-trimethyl hexanoyl) peroxide, succinic acid peroxide, tert-butyl peroxy-2-ethylhexanoate, tert-butyl peroxypivalate, and 1,1,3,3-tetramethylbutylperoxy-2-ethylhexanoate. These polymerization initiators may be used solely, or two or more of the polymerization initiators may be used in combination as appropriate. An amount of the polymerization initiator to be used may be set as appropriate in accordance with a combination of the monomer composition, reaction conditions, and the like, and is not particularly limited.

A weight-average molecular weight of the polymer used in the present invention is preferably in a range of 10000 to 300000, more preferably in a range of 20000 to 200000, and especially preferably in a range of 30000 to 150000. The range of not less than 10000 allows an obtained adhesive composition to have good flexibility, and the range of not more than 300000 allows an obtained adhesive composition to have good heat resistance.

(Addition of Thermal Polymerization Inhibitor)

A method for adding the thermal polymerization inhibitor to the polymer may be carried out by a publicly known method, and is not especially limited. For example, after copolymerization reaction is completed, the thermal polymerization inhibitor may be added, at once or stepwise, to the copolymerization reaction system, that is, a reaction container in which the copolymerization reaction has been carried out. Further, the thermal polymerization inhibitor may be dissolved in an appropriate organic solvent and then added.

[Film Adhesive]

The adhesive composition according to the present invention as described above may be used in various ways depending on its purpose. For example, the adhesive composition in a liquid form may be applied on a processed body such as a semiconductor wafer so as to form an adhesive layer. Alternatively, a film adhesive according to the present invention, that is, a film such as a flexible film on which an adhesive layer containing any one of the foregoing adhesive compositions is formed in advance and dried, may be used by attaching this film (film adhesive) to the processed body (film adhesive method).

As such, the film adhesive according to the present invention includes a film, and an adhesive layer provided on the film, containing any one of the aforementioned adhesive compositions.

Since the monomer composition further contains the maleimide group-containing monomer, the heat resistance of the adhesive composition constituting the adhesive layer is improved. As a result, it is possible to obtain a film adhesive that excels in heat resistance and adhesive strength in a high temperature environment.

Further, the adhesive composition contains the thermal polymerization inhibitor as such, thereby improving solubility of the adhesive layer. As a result, it is possible to obtain a film adhesive that is easily stripped off.

The film adhesive may be used such that a protection film is further provided on the adhesive layer. In this case, the adhesive layer is easily provided on a processed body by (i) stripping off the protection film which covers the adhesive layer; (ii) placing, on the processed body, the adhesive layer thus exposed, and (iii) stripping off the film from the adhesive layer.

Consequently, the use of the film adhesive allows formation of an adhesive layer having an even thickness and a good surface smoothness as compared to a case where the adhesive composition is directly applied on a processed body so as to form an adhesive layer.

The film to be used in manufacture of the film adhesive is not limited, as long as an adhesive layer formed on the film is strippable from the film and the film is a release film which can transfer the adhesive layer to a surface to be processed of a protection board, a wafer, or the like. An example of the film is a flexible film made of a synthetic resin film such as polyethylene terephthalate, polyethylene, polypropylene, polycarbonate or polyvinyl chloride, and having a thickness of 15 µm to 125 µm. It is preferable for the film to be strip-processed if necessary so that transfer can be readily carried out.

A publicly known method may be appropriately used as a method for forming the adhesive layer on the film in accordance with a thickness or an evenness of a desired adhesive layer. An example of the method is a method in which the adhesive composition of the present invention is applied on the film so that a dried film thickness of the adhesive layer is 10 to 1000 µm.

In a case where the protection film is to be used, the protection film to be used is not limited as long as the film is strippable from the adhesive layer. However, it is preferable for the protection film to be, for example, a polyethylene terephthalate film, a polypropylene film, or a polyethylene film. Moreover, the protective film is preferably coated with silicon or baked. This allows the protective film to be easily stripped off from the adhesive layer. A thickness of the protection film is not particularly limited, however is preferably in a range of 15 µm to 125 µm. This is because the adhesive film attached to the protective film can secure flexibility of the film adhesive.

A method of using the film adhesive is not particularly limited. For example, the following method may be taken in a case where the protection film is used: (i) the protection film is stripped off from the film adhesive, (ii) the adhesive layer thus exposed is placed on a surface of a processed body, and (iii) a heating roller is rolled on the film (a back surface of the surface on which the adhesive layer is formed), so that the adhesive layer is thermally compressed onto the surface of the processed body. At this time, by sequentially rolling up the protection film on a roller such as a reel roller, the protection film that is stripped off from the film adhesive may be stored and reused.

The adhesive composition of the present embodiment is not particularly limited as long as the adhesive composition is used for adhering purposes. However the adhesive composition is suitably used as an adhesive composition for adhering a high-precision processing protection board of a semiconductor wafer to a substrate such as a semiconductor wafer. The adhesive composition of the present invention is particularly suitably used as an adhesive composition, when a substrate such as the semiconductor wafer is grinded so that a thickness of the substrate is reduced, for attaching the substrate to a support plate (e.g., Japanese Patent Application Publication, Tokukai, No. 2005-191550A (Publication Date: Jul. 14, 2005)).

[Stripping Solution]

A commonly used stripping solution may be used as a stripping solution for removing the adhesive composition according to the present embodiment, that is, as a stripping solution for dissolving the adhesive composition and stripping off an adhesive layer made from the adhesive composition. However from a point of environmental burden and a stripping property, a stripping solution whose main component is PGMEA, ethyl acetate, or methyl ethyl ketone is preferably used.

[Heat Treatment Method]

A heat treatment method of the present invention includes the step of heating a material to be heated including the adhesive composition at a temperature in a range of 250° C. to 350° C.

Moreover, the heat treatment method of the present invention includes the steps of: forming an adhesive layer from the adhesive composition on a surface of a substrate; heating the substrate at a temperature in a range of 250° C. to 350° C.; and stripping off the adhesive layer from the substrate.

Firstly, an adhesive layer is formed on a substrate by use of the adhesive composition of the present invention (a forming step). A method for forming the adhesive layer is not especially limited, but may be for example, a method for forming an adhesive layer by use of the aforementioned film adhesive, a method for directly applying the adhesive composition by use of a publicly known technique, such as an applicator or a bar coater, or the like method. These methods allow formation of an adhesive coating film having an excellently-uniform film thickness.

After the adhesive layer is formed on the substrate, a material to be heated is adhered onto the adhesive layer. Then, an intended heat treatment is carried out with respect to the material to be heated that is adhered to the substrate (a heat treatment step). A temperature during the heat treatment can be determined as appropriate in accordance with what kind of treatment is carried out with respect to the material to be heated. However, the temperature is preferably not less than 250° C., more preferably not less than 250° C. but not more than 350° C. Further, the heat treatment may be carried out in high vacuum (for example, 3 Pa). By carrying out the heat treatment at the temperature, the adhesive composition of the present invention can successfully exhibit effects of adhesiveness at a high temperature and easiness in stripping off after a high-temperature process has been carried out.

After the material to be heated has been subjected to the heat treatment, the adhesive layer is dissolved and stripped off by use of the aforementioned stripping solution such as PGMEA so that the material to be heated is stripped off from the substrate (a stripping step).

In the heat treatment method of the present invention, the adhesive composition of the present invention is used. Therefore, the adhesive strength is successfully maintained even at a high temperature of 250° C. Further, even after the adhesive layer has been processed at a temperature of not less than 250° C. and in high vacuum of 3 Pa, the adhesive layer can be easily stripped off.

A purpose of the heat treatment method of the present invention is not especially limited as long as the adhesive composition of the present invention is used for the heat treatment. However, the heat treatment method of the present invention is favorably applicable to a series of processes of: (i) adhering a protection board for use in high-precision processing of a semiconductor wafer, to a substrate such as a semiconductor wafer, (ii) carrying out a high-temperature process, and subsequently (iii) separating the protection board from the semiconductor wafer.

The following deals with examples of the present invention. However, the present invention is not limited to these examples.

EXAMPLES

Firstly explained is a method for preparing an adhesive composition of Example 1 in detail.

Into a 300 ml four-neck flask equipped with a reflux condenser, a stirrer, a thermometer, and a nitrogen inlet tube, (i) 111.6 g of PGMEA as a solvent, and (ii) as shown in Table 1, 30 g of methyl methacrylate, 52 g of styrene, and 18 g of cyclohexylmaleimide, those as monomers, were added, and blowing of $N_2$ into the flask was initiated. A mixture in the flask was stirred so that polymerization was initiated. While the mixture was being stirred, a temperature in the flask was increased to 100° C. Then, a mixed solution containing 13.33 g of PGMEA and 1 g of t-butyl peroxy 2-ethylhexanoate (a polymerization initiator) was continuously dropped via a dropping nozzle into the flask over 4 hours. A dropping speed was constant.

After the dropping was completed, an obtained polymerization reaction solution was left for aging at 100° C. for 1 hour. Then, a mixed solution containing 25.10 g of PGMEA and 0.3 g of t-butyl peroxy 2-ethylhexanoate was dropped into the polymerization reaction solution over 1 hour. After the polymerization reaction solution was further left for aging at 100° C. for 1 hour, 1.0 g of 1,1,3,3-tetramethylbutylperoxy 2-ethylhexanoate was added to the solution at once. Subsequently, the polymerization reaction solution was left for aging at 100° C. for 3 hours. After a temperature of the polymerization reaction solution was increased until a reflux of the solvent was observed, the polymerization reaction solution was left for aging for 1 hour. After that, the polymerization was terminated. In this way, a resin 1 was synthesized.

Further, an adhesive composition of Example 4 was prepared as follows.

Into a 300 ml four-neck flask equipped with a reflux condenser, a stirrer, a thermometer, and a nitrogen inlet tube, (i) 111.6 g of PGMEA as a solvent, and (ii) as shown in Table 1, 58 g of methyl methacrylate, 20 g of styrene, and 18 g of cyclohexylmaleimide, those as monomers, were added, and blowing of $N_2$ into the flask was initiated. A mixture in the flask was stirred so that polymerization was initiated. While the mixture was being stirred, a temperature in the flask was increased to 100° C. Then, (i) a mixed solution containing 13.3 g of PGMEA and 20 g of styrene and (ii) a mixed solution containing 13.3 g of PGMEA and 0.6 g of t-butyl peroxy 2-ethylhexanoate were continuously dropped via dropping nozzles, respectively, into the flask over 4 hours. A dropping speed was constant. After the dropping was completed, an obtained polymerization reaction solution was subjected to the same treatments as those carried out with respect to the resin 1 of Example 1. In this way, a resin 4 was synthesized.

Resins 2 of Examples 2, 6, and 7, a resin 3 of Example 3, and a resin 6 of Comparative Example 1 were synthesized in the same manner as the resin 1 of Example 1. A resin 5 of Example 5 was synthesized in the same manner as the resin 4 of Example 4.

As such, in Example 1 through 3, Examples 6 and 7, and Comparative Example 1, after a monomer composition was wholly mixed in advance, copolymerization reaction was initiated. On the other hand, in Examples 4 and 5, part of styrene to be used (Example 4) or all styrene to be used (Example 5) was mixed into a flask after components other than the part of or all the styrene, of the monomer composition, had been mixed in the flask and polymerization had been initiated.

Further, resins 7 and 8 of Examples 8 through 13 and Comparative Example 2 and a resin 9 of Example 14 were synthesized in the same manner as the resin 1 of Example 1. In Example 14, in synthesizing the resin 9, dicyclopentanyl diacrylate was also mixed, as a bifunctional monomer, with a monomer composition. In this way, in Examples 8 through 14 and Comparative Example 2, after a monomer composition was wholly mixed in advance, copolymerization reaction was initiated.

Moreover, resins 10 of Example 15 and Comparative Example 3, resins 11 of Example 16 and Comparative Example 4, and resins 12 of Examples 17 and 18 and Comparative Example 5 were synthesized in the same manner as the resin 4 of Example 4 except that phenylmaleimide was also mixed as a monomer before polymerization was initiated. In Examples 15 through 18 and Comparative Example 3 through 5, all styrene to be used was mixed into a flask after components other than the styrene, of a monomer composition, had been mixed in the flask and polymerization had been initiated.

Tables 1 through 3 show compositions of monomer compositions in Examples and Comparative Examples and weight-average molecular weights of the resins obtained by polymerizing the monomer compositions, respectively.

TABLE 1

| Composition (mass ratio) | Ex. 1 (Resin 1) | Ex. 2 (Resin 2) | Ex. 3 (Resin 3) | Ex. 4 (Resin 4) | Ex. 5 (Resin 5) | Ex. 6 (Resin 2) | Ex. 7 (Resin 2) | Com. Ex. 1 (Resin 6) |
|---|---|---|---|---|---|---|---|---|
| Methyl methacrylate | 30 | 40 | 80 | 58 | 58 | 40 | 40 | 30 |
| Styrene (Random) | 52 | 42 | 0 | 20 | 0 | 42 | 42 | 52 |
| Styrene (Mixed after initiation of synthesis reaction) | 0 | 0 | 0 | 20 | 40 | 0 | 0 | 0 |
| Cyclohexylmaleimide | 18 | 18 | 20 | 18 | 18 | 18 | 18 | 18 |
| Weight-average molecular weight | 82000 | 80000 | 80000 | 80000 | 80000 | 80000 | 80000 | 82000 |

TABLE 2

| Composition (mass ratio) | Ex. 8 (Resin 7) | Ex. 9 (Resin 7) | Ex. 10 (Resin 7) | Ex. 11 (Resin 7) | Ex. 12 (Resin 8) | Ex. 13 (Resin 8) | Ex. 14 (Resin 9) | Com. Ex. 2 (Resin 7) |
|---|---|---|---|---|---|---|---|---|
| Methyl methacrylate | 50 | 50 | 50 | 50 | 50 | 50 | 50 | 50 |
| Styrene (Random) | 32 | 32 | 32 | 32 | 32 | 32 | 32 | 32 |
| Styrene (Mixed after initiation of synthesis reaction) | 0 | 0 | 0 | 0 | 0 | 0 | 0 | 0 |
| Cyclohexylmaleimide | 18 | 18 | 18 | 18 | 18 | 18 | 18 | 18 |
| Dicyclopentanyl diacrylate | 0 | 0 | 0 | 0 | 0 | 0 | 0.7 | 0 |
| Weight-average molecular weight | 80000 | 80000 | 80000 | 80000 | 118000 | 118000 | 180000 | 80000 |

TABLE 3

| Composition (mass ratio) | Ex. 15 (Resin 10) | Com. Ex. 3 (Resin 10) | Ex. 16 (Resin 11) | Com. Ex. 4 (Resin 11) | Ex. 17 (Resin 12) | Ex. 18 (Resin 12) | Com. Ex. 5 (Resin 12) |
|---|---|---|---|---|---|---|---|
| Methyl methacrylate | 50 | 50 | 30 | 30 | 50 | 50 | 50 |
| Styrene (Random) | 0 | 0 | 0 | 0 | 0 | 0 | 0 |
| Styrene (Mixed after initiation of synthesis reaction) | 32 | 32 | 30 | 30 | 10 | 10 | 10 |
| Cyclohexylmaleimide | 10 | 10 | 20 | 20 | 20 | 20 | 20 |
| Phenylmaleimide | 8 | 8 | 20 | 20 | 20 | 20 | 20 |
| Weight-average molecular weight | 86000 | 86000 | 86000 | 86000 | 81000 | 81000 | 81000 |

*Abbreviation:
Ex. stands for Example.
Com. Ex. stands for Comparative Example.

Each of the resins 1 through 12 and a thermal polymerization inhibitor were dissolved in PGMEA so as to prepare an adhesive composition in which a concentration of the polymer was 40 wt %. Tables 4 through 6 show an amount of the thermal polymerization inhibitor to be added in each of Examples and Comparative Examples. IRGANOX1010 (manufactured by Ciba Speciality Chemicals Corporation) was used as the thermal polymerization inhibitor.

TABLE 4

| Additive amount of thermal polymerization inhibitor | Ex. 1 | Ex. 2 | Ex. 3 | Ex. 4 | Ex. 5 | Ex. 6 | Ex. 7 | Com. Ex. 1 |
|---|---|---|---|---|---|---|---|---|
| With respect to 100 pt. wt. | 1 pt. wt. | 1 pt. wt. | 1 pt. wt. | 1 pt. wt. | 1 pt. wt. | 2 pts. wt. | 4 pts. wt. | Not added |

TABLE 5

| Additive amount of thermal polymerization inhibitor | Ex. 8 | Ex. 9 | Ex. 10 | Ex. 11 | Ex. 12 | Ex. 13 | Ex. 14 | Com. Ex. 2 |
|---|---|---|---|---|---|---|---|---|
| With respect to 100 pt. wt. | 1 pt. wt. | 3 pts. wt. | 5 pts. wt. | 10 pts. wt. | 1 pt. wt. | 5 pts. wt. | 5 pts. wt. | Not added |

TABLE 6

| Additive amount of thermal polymerization inhibitor With respect to 100 pt. wt. | Ex. 15 | Com. Ex. 3 | Ex. 16 | Com. Ex. 4 | Ex. 17 | Ex. 18 | Com. Ex. 5 |
|---|---|---|---|---|---|---|---|
| | 5 pts. wt. | Not added | 5 pts. wt. | Not added | 1 pt. wt. | 5 pts. wt. | Not added |

*Abbreviation:
Ex. stands for Example.
Com. Ex. stands for Comparative Example.
pt(s). wt. stands for part(s) by weight.

The adhesive compositions according to Examples 1 through 18 and Comparative Examples 1 through 5 were applied on 6-inch silicon wafers, respectively, and dried at 110° C., 150° C., and then 200° C., each for 3 minutes, that is, dried for 9 minutes in total. In this way, coating films having a thickness of 15 μm were formed on the silicon wafers, respectively.

The following explains about measurement results on the adhesive compositions thus applied on the silicon wafers.

(Evaluation of Heat Resistance and Measurement of Degassing Amount)

A temperature of each of the coating films was increased from 40° C. to 250° C. and an amount (degassing amount) of gas generated from each of the coating films was measured. Heat resistance of each of the adhesive composition was evaluated from the degassing amount.

A reason why heat resistance can be evaluated from the degassing amount is as follows. That is, a degassing amount measured until a temperature increased to 100° C., is an amount of gas derived from either water vapor or its azetropic gas. The water vapor or the azetropic gas is derived from moisture absorbed by the adhesive composition. On the other hand, a degassing amount measured at a temperature of not less than 100° C. is derived from gas that has been generated due to decomposition of the adhesive composition caused by heat. Therefore, the heat resistance can be evaluated from the degassing amount at a temperature of not less than 100° C., particularly around 200° C.

A TDS method (Thermal Desorption Spectroscopy method) was employed for the measurement of the degassing amount. EMD-WA1000 (manufactured by ESCO, Ltd.) was used as a TDS measuring device (discharged gas measuring device).

A measuring condition of the TDS device was set as Width: 100; Center Mass Number: 50; Gain: 9; Scan Speed: 4; and Emult Volt: 1.3 KV.

The heat resistance was evaluated at a temperature of 200° C. based on definitions as follows: "G (good)" indicates a case where a strength (Indensity) found by the TDS measuring device was less than 100000, and no residue was observed by a metallurgical microscope; "S (sufficient)" indicates a case where the Indensity was not less than 100000, however no residue was observed by the metallurgical microscope; and "P (poor)" indicates a case where the Indensity was not less than 100000 and a residue was observed by the metallurgical microscope.

Further, the degassing amount was evaluated at 200° C. based on definitions as follows: "G" indicates a case where a strength (Indensity) found by the TDS measuring device was less than 100000; and "P" indicates a case where the Indensity was not less than 100000.

(Evaluation of Flexibility)

Firstly, it was observed by eye whether or not there were cracks on coated film layers applied on the silicon wafers, respectively. A coated film layer that had a crack was evaluated as "P"; and a coated film layer that had no crack was evaluated as "G".

Subsequently, a heat cycle test was carried out with respect to each of the silicon wafers by use of a thermal shock test device, TSE-11A (manufactured by ESPEC Corp.). After the heat cycle test, it was observed whether or not there were cracks on the silicon wafers to evaluate flexibilities of the adhesive compositions. The heat cycle test was carried out as follows. Each of the resins was maintained at −30° C. for 30 minutes and then at +80° C. for 30 minutes, as one cycle, and this process was repeated five times in total. After the heat cycle test, whether or not there were cracks on the coated film layers was observed by eye. A coated film layer that had a crack was evaluated as "P"; and a coated film layer that had no crack was evaluated as "G".

(Evaluation of Solubility with Heat Resistance and Measurement of Dissolution Rate)

After the silicon wafers were heated at 250° C. for 1 hour, the silicon wafers were immersed in PGMEA. After the immersion, it was observed by eye whether the coated film layers were dissolved or not. A coated film layer that was dissolved was evaluated as "G"; and a coated film layer that was not dissolved was evaluated as "P".

Further, a dissolution rate (nm/sec) was calculated from a relationship between a thickness of a coated film layer that was dissolved and a dissolution time.

(Evaluation of Adhesive Strength)

Glass substrates were adhered to the coated film layers of the adhesive compositions, provided on the silicon wafers, respectively, at 200° C. with a load of 1 kg. The glass substrates were pulled, and adhesive strengths at a time when the glass substrates were stripped off from the silicon wafers, respectively, were found by use of a vertical model motorized stand "MX-500N" (manufactured by IMADA CO., LTD.). An adhesive composition whose adhesive strength at 250° C. was not less than 2 kg/cm$^2$ was evaluated as "G"; and an adhesive composition whose adhesive strength at 250° C. was less than 2 kg/cm² was evaluated as "P".

The adhesive compositions of Examples 1 through 18 and Comparative Examples 1 through 5 were compared in terms of adhesive strength at 250° C., generated gas, heat resistance, flexibility, solubility with heat resistance, and a dissolution rate. Tables 7 through 9 show results of the comparison.

TABLE 7

| Evaluation Result | Ex. 1 | Ex. 2 | Ex. 3 | Ex. 4 | Ex. 5 | Ex. 6 | Ex. 7 | Com. Ex. 1 |
|---|---|---|---|---|---|---|---|---|
| Adhesive Strength at High Temperature (250° C.) | G | G | G | G | G | G | G | G |
| Generated Gas | G | G | G | G | G | G | G | G |
| Heat Resistance | G | G | G | G | G | G | G | G |
| Flexibility (After application) | G | G | G | G | G | G | G | G |
| Flexibility (After heat cycle test) | P | G | G | G | G | G | G | P |
| Solubility with Heat Resistance (250° C., 1 hour) | G | G | G | G | G | G | G | P |
| Dissolution rate (nm/sec) | 80 | 75 | 60 | 80 | 80 | 76 | 74 | 0 |

TABLE 8

| Evaluation Result | Ex. 8 | Ex. 9 | Ex. 10 | Ex. 11 | Ex. 12 | Ex. 13 | Ex. 14 | Com. Ex. 2 |
|---|---|---|---|---|---|---|---|---|
| Adhesive Strength at High Temperature (250° C.) | G | G | G | G | G | G | G | G |
| Generated Gas | G | G | G | G | G | G | G | G |
| Heat Resistance | G | G | G | G | G | G | G | G |
| Flexibility (After application) | G | G | G | G | G | G | G | G |
| Flexibility (After heat cycle test) | G | G | G | G | G | G | G | G |
| Solubility with Heat Resistance (250° C., 1 hour) | G | G | G | G | G | G | G | P |
| Dissolution rate (nm/sec) | 77 | 77 | 76 | 75 | 68 | 66 | 66 | 0 |

TABLE 9

| Evaluation Result | Ex. 15 | Com. Ex. 3 | Ex. 16 | Com. Ex. 4 | Ex. 17 | Ex. 18 | Com. Ex. 5 |
|---|---|---|---|---|---|---|---|
| Adhesive Strength at High Temperature (250° C.) | G | G | G | G | G | G | G |
| Generated Gas | G | G | G | G | G | G | G |
| Heat Resistance | G | G | G | G | G | G | G |
| Flexibility (After application) | G | G | G | G | G | G | G |
| Flexibility (After heat cycle test) | G | G | P | P | G | G | G |
| Solubility with Heat Resistance (250° C., 1 hour) | G | P | G | P | G | G | P |
| Dissolution rate (nm/sec) | 65 | 0 | 40 | 0 | 20 | 20 | 0 |

*Abbreviation:
Ex. stands for Example.
Com. Ex. stands for Comparative Example.

In regard to the wafer of Example 7, after the wafer was heated at 300° C. for 1 hour, the "evaluation of solubility with heat resistance" was carried out with respect to the adhesive composition of Example 7 in the same manner as above. As a result of the evaluation, it was observed that the adhesive composition was dissolved (a dissolution speed: 83 nm/sec).

As shown in Tables 7 through 9, it was demonstrated that Examples of the present invention exhibited good solubility with heat resistance and the coated film layers of Examples were dissolved even after the coated film layers had been heated at a high temperature of 250° C. Further, it was found that the coated film layer of Example 7 was dissolved even after the coated film layer was heated at a high temperature of 300° C. In contrast, in Comparative Examples 1 through 5, the coated film layers were not dissolved.

The measurement of flexibility of an adhesive composition that has been subjected to the heat cycle test is a flexibility measurement carried out under tougher conditions. Therefore, even if a crack was observed in the flexibility measurement under such tougher conditions, there occurs no problem in terms of use of the adhesive composition of the present invention.

As described above, an adhesive composition of the present invention is an adhesive composition (a) whose main component is a polymer obtained by copolymerizing a monomer composition containing a monomer having a maleimide group and (b) which further contains a thermal polymerization inhibitor. This allows an obtained adhesive composition to have, in a main chain of the polymer, an imide ring derived from the monomer having a maleimide group. As a result, (i) heat resistance at a high temperature, (ii) adhesiveness in a high temperature environment (especially, at 200° C. to 250° C.), and (ii) alkaline resistance, of the obtained adhesive composition, are improved.

Moreover, the adhesive composition further contains a thermal polymerization inhibitor. As a result, thermal polymerization is restrained during a high-temperature process (especially, at 250° C. and 3 Pa), thereby resulting in that it is possible to easily strip off an adhesive layer made from the adhesive composition, even after the adhesive layer has been subjected to a high-temperature process.

In this way, the present invention makes it advantageously possible to provide an adhesive composition (i) which excels in heat resistance, adhesive strength in a high temperature environment (especially, 200° C. to 250° C.), and alkaline resistance and (ii) which allows an adhesive layer made from the adhesive composition to be easily stripped off even after the adhesive layer has been subjected to a high-temperature process in which the adhesive layer is heated at 250° C. for 1 hour.

An adhesive composition and a film adhesive, according to the present invention, (i) have high heat resistance, (ii) generate little gas while being heated, (iii) excel in adhesive strength at a high temperature, and (iv) are excellently dissolved even after a high-temperature process has been carried out. As a result, the adhesive composition and the film adhesive of the present invention can be favorably used in processing of a semiconductor wafer or a chip which processing requires a high-temperature process.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An adhesive composition dissolved in an organic solvent, wherein the adhesive composition comprises:
   (1) as a main component, a polymer obtained by copolymerizing a monomer composition comprising (i) an alkyl (meth)acrylate, (ii) a monomer having a maleimide group, and (iii) styrene, and
   (2) a thermal polymerization inhibitor,
   wherein the monomer having a maleimide group is contained in the monomer composition in an amount of not less than 5.0 wt. % but not more than 20 wt. %,
   wherein an amount of the alkyl (meth)acrylate in the monomer composition is not less than 30 parts by weight but not more than 58 parts by weight,
   an amount of the styrene in the monomer composition is not less than 30 parts by weight but not more than 60 parts by weight, and
   the total amount of the monomer composition is 100 parts by weight, and
   wherein the adhesive composition remains soluble in propylene glycol monomethyl ether acetate even if the adhesive composition is heated at 250° C. for 1 hour.

2. The adhesive composition as set forth in claim 1, wherein:
   the thermal polymerization inhibitor is contained in the adhesive composition by not less than 0.1 wt. % but not more than 10.0 wt. %.

3. The adhesive composition as set forth in claim 1, wherein:
   the thermal polymerization inhibitor is a phenolic thermal polymerization inhibitor.

4. The adhesive composition as set forth in claim 1, wherein:
   the polymer has a styrene block segment.

5. The adhesive composition as set forth in claim 1, wherein:
   a mass ratio of the alkyl (meth)acrylate with respect to the styrene is within a range of 0.1:1 to 3:1.

6. A film adhesive comprising:
   a film; and
   an adhesive layer provided on the film, comprising the adhesive composition as set forth in claim 1.

7. The adhesive composition as set forth in claim 1,
   wherein the monomer having a maleimide group is a monomer represented by formula (1)

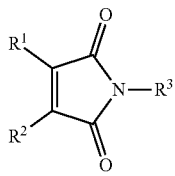

(1)

wherein $R^1$ and $R^2$ independently represent a hydrogen atom or a C1 through C20 organic group, and the organic group may contain an oxygen atom, a nitrogen atom, a sulfur atom, or a halogen atom; and $R^3$ represents an alkyl group, an alicyclic hydrocarbon group, or an aryl group.

8. The adhesive composition as set forth in claim 1, further comprising
   a compound having two functional groups.

9. A heat treatment method comprising the step of heating a material to be heated at a temperature in a range from 250° C. to 350° C.,
   wherein the material to be heated is an adhesive composition comprising:
   (1) as a main component, a polymer obtained by copolymerizing a monomer composition comprising (i) an alkyl (meth)acrylate, (ii) a monomer having a maleimide group, and (iii) styrene, and
   (2) a thermal polymerization inhibitor,
   wherein the monomer having a maleimide group is contained in the monomer composition in an amount of not less than 5.0 wt. % but not more than 20 wt. %,
   wherein an amount of the alkyl (meth)acrylate in the monomer composition is not less than 30 parts by weight but not more than 58 parts by weight,
   an amount of the styrene in the monomer composition is not less than 30 parts by weight but not more than 60 parts by weight, and
   the total amount of the monomer composition is 100 parts by weight, and
   wherein the adhesive composition remains soluble in propylene glycol monomethyl ether acetate even if the adhesive composition is heated at 250° C. for 1 hour.

10. The heat treatment method as set forth in claim 9, comprising the steps of:
    (a) forming an adhesive layer from the adhesive composition on a surface of a substrate;
    (b) heating the substrate at a temperature in a range of 250° C. to 350° C. after the step (a); and
    (c) stripping off the adhesive layer from the substrate after the step (b).

* * * * *